(12) United States Patent
Haverinen

(10) Patent No.: US 11,357,157 B2
(45) Date of Patent: Jun. 14, 2022

(54) METHOD AND ARRANGEMENT FOR ASSISTING CONTROL OF FOREST WORK MACHINE

(71) Applicant: PONSSE OYJ, Vieremä (FI)

(72) Inventor: Juha Haverinen, Vieremä (FI)

(73) Assignee: PONSSE OYJ, Vieremä (FI)

( * ) Notice: Subject to any disclaimer, the term of this patent is extended or adjusted under 35 U.S.C. 154(b) by 0 days.

(21) Appl. No.: 17/272,142

(22) PCT Filed: Aug. 28, 2019

(86) PCT No.: PCT/FI2019/050611
§ 371 (c)(1),
(2) Date: Feb. 26, 2021

(87) PCT Pub. No.: WO2020/043948
PCT Pub. Date: Mar. 5, 2020

(65) Prior Publication Data
US 2021/0321552 A1    Oct. 21, 2021

(30) Foreign Application Priority Data
Aug. 30, 2018   (FI) .................... 20185721

(51) Int. Cl.
*A01B 69/00*    (2006.01)
*A01G 23/00*    (2006.01)
*B60Q 9/00*    (2006.01)

(52) U.S. Cl.
CPC .......... *A01B 69/001* (2013.01); *A01G 23/003* (2013.01); *B60Q 9/00* (2013.01); *B60Q 2400/50* (2013.01)

(58) Field of Classification Search
CPC .... A01B 69/001; A01G 23/00; A01G 23/003; A01G 23/08; B60Q 2400/50; B60Q 9/00; G06V 20/20
See application file for complete search history.

(56) References Cited

U.S. PATENT DOCUMENTS

2016/0326724 A1    11/2016   Hartman et al.
2017/0072843 A1    3/2017    Lection et al.
(Continued)

FOREIGN PATENT DOCUMENTS

DE    10 2011 119 923    5/2013
GB           2517790      3/2015
(Continued)

OTHER PUBLICATIONS

International Preliminary Report for Patentability for PCT/FI2019/050611 dated Dec. 17, 2020, 23 pages.
(Continued)

*Primary Examiner* — Omeed Alizada
(74) *Attorney, Agent, or Firm* — Nixon & Vanderhye PC

(57) ABSTRACT

The invention relates to a method and forest work machine (1) making use of it, by means of which the control of the forest work machine is assisted. In the forest work machine, a light source (2) is adapted, which may be directed to one or more different parts of the surroundings around it, forming the working area of the forest work machine. This is adapted to produce at least one specifically defined specified-form light pattern (3) on said working area. With such a light pattern, visual information content may be produced on the working area to support an operator of the forest work machine in their work. As content of such information, it is possible to define control measures for the forest work machine, performed in any working area or their restrictions.

11 Claims, 3 Drawing Sheets

(56) References Cited

U.S. PATENT DOCUMENTS

2019/0161943 A1* 5/2019 Frank ................. E02F 9/24
2020/0039421 A1* 2/2020 Gröne ................. B60Q 1/50
2021/0307230 A1* 10/2021 Ku ................. B60Q 1/0023

FOREIGN PATENT DOCUMENTS

WO    2011/067456    6/2011
WO    2017/027925    2/2017
WO    2018/038654    3/2018

OTHER PUBLICATIONS

Search Report for FI Application No. 20185721 dated Jan. 10, 2019, 2 pages.
International Search Report for PCT/FI2019/050611 dated Nov. 1, 2019, 5 pages.
Written Opinion of the ISA for PCT/FI2019/050611 dated Nov. 1, 2019, 7 pages.

* cited by examiner

METHOD AND ARRANGEMENT FOR ASSISTING CONTROL OF FOREST WORK MACHINE

This application is the U.S. national phase of International Application No. PCT/FI2019/050611 filed Aug. 28, 2019 which designated the U.S. and claims priority to FI Patent Application No. 20185721 filed Aug. 30, 2018, the entire contents of each of which are hereby incorporated by reference.

BACKGROUND OF THE INVENTION

The present invention relates to a method which may be used to assist the control a forest work machine.

The invention further relates to an arrangement in a light source and a forest work machine with which and in which such assisting may be realized.

In work machines, it is customary to use headlights and searchlights of different kinds that make working easier. In addition, work machines moving on public roads and other common areas are equipped with coloured warning lights of different kinds to warn outsiders of a work machine working in the area. Even though the headlights and searchlights currently in use produce more and more luminosity, a mere flood of white light is not enough to speed up or simplify working and does not enable optimising or prioritising a working order.

BRIEF DESCRIPTION OF THE INVENTION

It is therefore an object of the invention to achieve a method and an arrangement as well as a forest work machine so that the aforementioned problems may for the most part be solved.

This object is achieved so that the method and arrangement for assisting the control of a forest work machine have the characterizing features defined in the claims according to the present invention. More specifically, the method of the invention is mainly characterized by conveying information prioritizing a working order to the operator of the forest work machine by one or more light patterns simultaneously projected on the working area. The arrangement and the forest work machine according to the invention are in turn mainly characterized by the one or more light patterns simultaneously projected on the working area comprising information prioritizing the work order being conveyed to the operator of the forest work machine.

The preferred embodiments of the invention are disclosed in the dependent claims.

As working is becoming more and more pressing and the wishes of customers more and more detailed, the present invention seeks on its part to simplify the everyday work of an operator of a work machine, and in this context that of a forest work machine, in particular.

By projecting into the immediate environment of a forest work machine the work areas surrounding the machine, precautionary areas, storage areas, available driving routes or work sites or work to be performed, such as individual trees to be felled, an operator, supported by these visual instructions, will have it easier to focus on the control of the actual forest work machine and its work devices.

The invention provides considerable advantages. It allows the speed-up of work by facilitating the perception of work areas and safe range of tools. By means of the invention, the work areas and precautionary areas in the surrounding of the forest work machine may be quickly visualised. Preplanning of working and transportation routes becomes possible, and by making use of one or more light sources visualize them in the surroundings of the forest work machine whenever needed. Objects requiring specific measures may be identified in the surroundings, and the attention of the operator of the forest work machine focused on them.

In a forest work machine environment, in particular, the focusing of a work machine operator on the actual timber processing allows improvements in production efficiency and profitability. Due to the invention, the operator can focus on carrying out the actual work and deciding on the working order, and, if need be, changing it on the basis of up-to-date information. All the means by which the shifting of an operator's gaze from the actual job to, for example, a display unit of a control device, can be minimized are a major method of improvement. In particular in the so-called cut-to-length logging, in which the timber gathered from a forest is cut to timber pieces of the desired length as early as in the logging area, information relating to the cutting of the tree to be felled, that is marking for cross-cutting or bucking, is the most essential. By presenting the cut-off points on the tree to be cut/that was cut instead on a display unit of a control device, an operator will find it easier and faster to make the final bucking decision. The earlier information that facilitates decision-making may be visualised, the more useful this is for boosting operations and lowering cognitive strain.

In addition, a working environment is achieved with the invention, in which visual information according to augmented reality may be presented without the typical AR/VR glasses. The use of AR/VR glasses increases the costs of working, impairs working ergonomics, and adds to the number of devices to be maintained/serviced thus binding resources.

Other advantages the invention brings about are described in the following with more detailed description of specific embodiments of the invention.

BRIEF DESCRIPTION OF THE DRAWINGS

In the following, some preferred embodiments of the invention are described in closer detail with reference to the accompanying drawing in which.

DETAILED DESCRIPTION OF PREFERRED EMBODIMENTS

Figure 1:
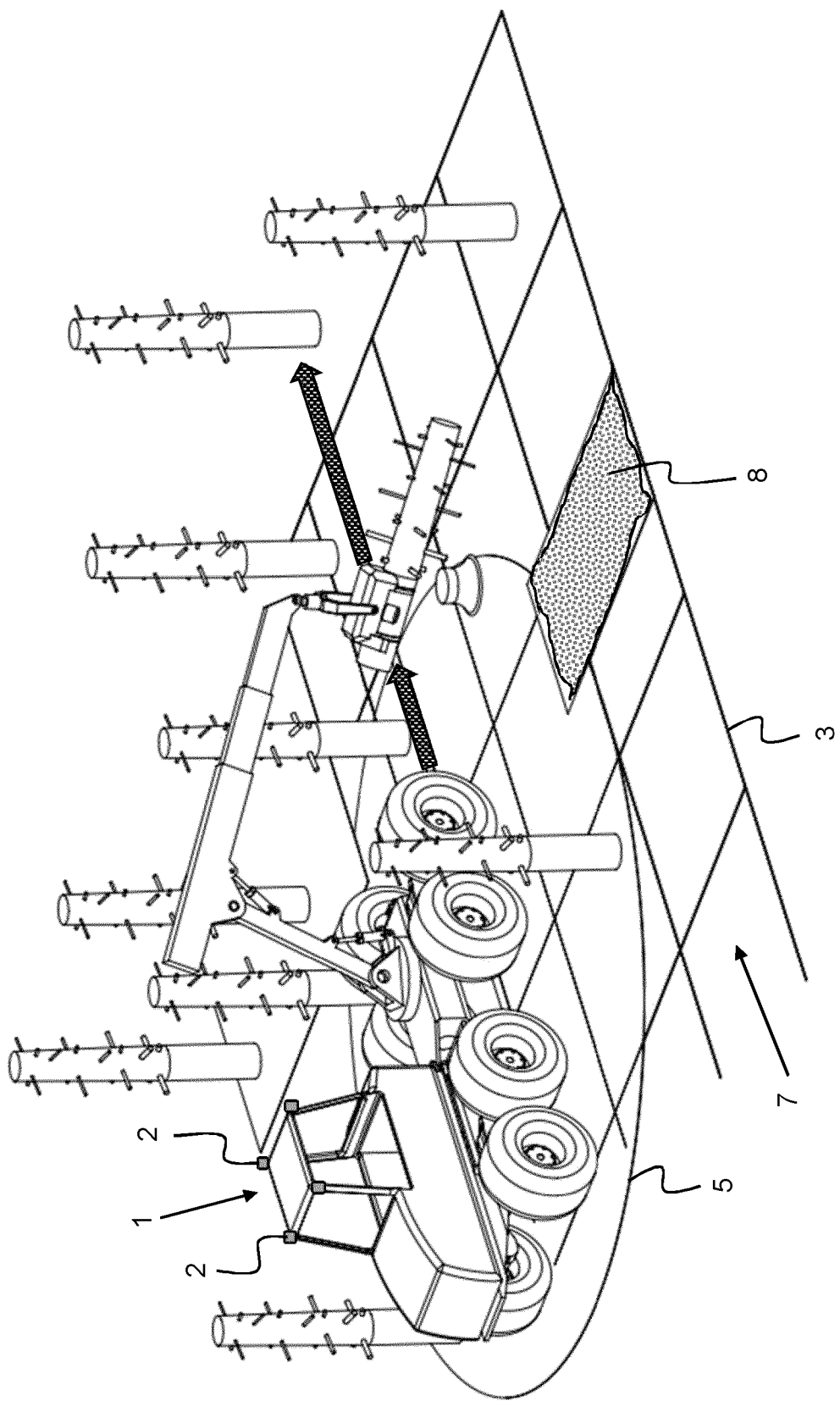
FIG. 1 shows a forest work machine in a thinning task.

The present invention relates to a method and arrangement for assisting the control of a forest work machine. Even though the invention will in the following be described in detail with reference to the disclosed exemplary embodiments, it should be understood that the invention is not restricted only to the specific arrangement described and/or to the method described herein. Even though the present embodiment describes different inventive features and combining them, it is obvious for a person skilled in the art that any of these features may also be used as such or combined in another way according to the idea of the invention.

Even though the method, work machine and arrangement will in the following be described in an exemplary manner by the use of a forest work machine, this does not, however, restrict applying the solution to this field of technology, only, but the solution is very much suitable for use in moving work machines of all kinds, but in particular to all work machines moving on the terrain.

The present method, whose purpose is to assist an operator controlling a forest work machine 1, utilizes in a completely new way one or more light sources 2 adapted to the work machine and directable to different parts of its surroundings, the technical details of which light sources are not disclosed in this context. In this exemplary embodiment, the forest work machine may be a felling and cutting forest work machine, such as a harvester or a combination machine, that is, a combination of a harvester and forwarder, which handles trunks to be felled and cut. Such parts in the surroundings of the work machine form the immediate working area of the work machine, or areas otherwise supporting working, such as the wheel tracks of the machine itself or those of previous work machines, storage areas, protected areas or areas to be protected. Such a light source is advantageously installed or installable in the cabin, body, or work device of the work machine, such as the boom system shown in the figures.

A light source 2, installed in the work machine 1 in connection with its manufacture or afterwards, is in the present solution adapted to produce at least one specifically defined specified-form light pattern 3 which is focused on said working area in the surroundings of the work machine. By means of this light pattern, which may be projected in different shapes at different times, visual information content for each working situation may be achieved on the working area to support the action of an operator operating the work machine. Consequently such information content is advantageously produced in a control unit of the work machine and projected on the basis of, for example, location information of the work machine, and/or standing timber, timber map, or timber view, predefined measures planned to be carried out by the work machine in each working area, or restrictions concerning the performing of these.

On the other hand, the presentation of the work machine's own space or the boundaries of the working area may utilize, for example, acceleration sensor information from the sensor modules of the work machine on the position and/or tilt angle of the work machine. Moreover, information is obtained from sensor modules in the boom system, measuring the position of individual booms, based on which the position of the boom system may be determined, and its range and lifting capacity with different loads calculated, and the torque the payload causes on the work machine, described for example in publication WO 2013/178886, paragraph [0026].

By forming the projected light pattern 3 from, for example, at least one line-like projection directed on the working area of the terrain, the cutting area of a forest work machine, excavation line of an excavator, or outer edge of an area to be ploughed, for example, may be outlined. FIG. 2, for example, shows a logging area boundary presented by a line 4. With such a line-like projection, as in FIGS. 1 and 2, an operator may be informed of the outer limits 5 of a carrying capacity of a loader with different loads, for example, or provide information on obstacles in the surroundings, such as power lines or underground sewer or cable lines. The projection may in this case be straight, curved, or their combination. It may also consist of a plurality of projections simultaneously directed in the surroundings of the work machine, which as concerns their shape may be different, adjacent, overlapping, or nested.

By means of the light pattern 3, information otherwise supporting work may also be projected on the working area. Such information may be, as in FIG. 2, for example, alphanumeric information, or different kinds of symbols such as arrows, crosses, circles etc. This is denoted by reference mark 6 in FIG. 2. This way, the working order, for example, may be prioritised, obstacles present in the terrain, but invisible, may be warned about etc.

Figure 2:
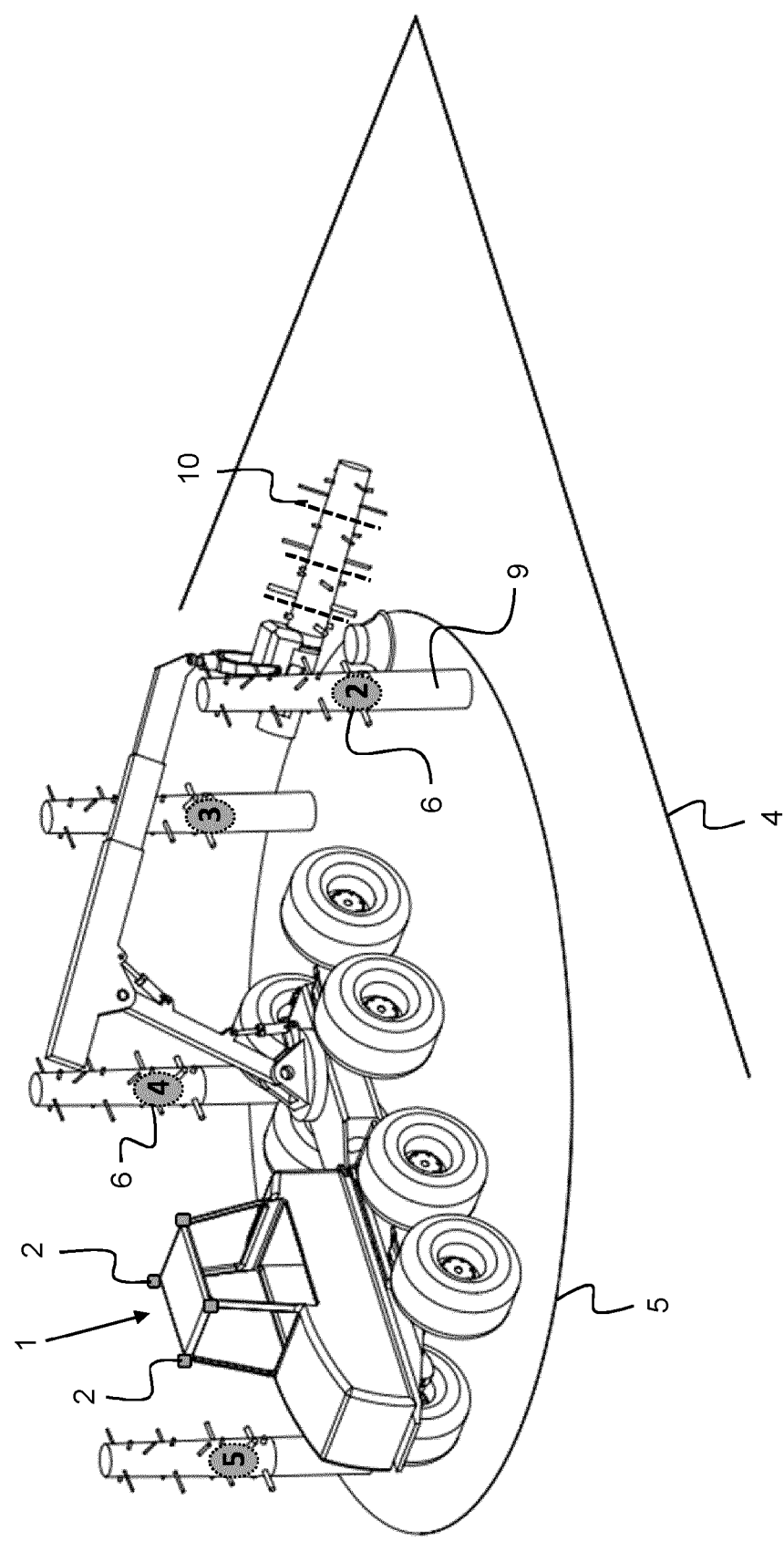
FIG. 2 shows a forest work machine in a final cutting task.

By forming the light pattern 3 of at least one geometric shape projected on the working area, or of two or more lines projected crosswise on the terrain, by means of which a grid 7, adjustable as to its density and consisting of adjacent fields, may be created on the terrain as in FIG. 1, hereby producing closed forms in the surroundings by means of which specific locations of the working area may be delimited. These may be storage areas 8 or, to take another example, passing places cleared next to the wheel tracks. Said grid may likewise be used to illustrate the thinning density of thinning based on the desired thinning density.

The aforementioned light patterns 3 and/or the parallel fields they form, or closed forms of another kind may further by projected at two wavelengths to establish a light pattern of two colours, to visualize different working conditions and restrictions of the work machine. This is shown by way of example in FIG. 1 by providing the storage area 8 with its own raster coating.

To achieve said projections, one or more light sources 2 on the work machine 1 are controlled by information continuously supplied by the control unit of the work machine, which may include, for example, driving direction, position information, information about the standing timber, or a timber map stored in felling information, or information obtained on the basis of the visible timber. The light source may likewise be directed by information continuously available on the location information of the work machine.

By making use of the present solution, the operator of the work machine 1 is at all times aware of the borders of the working area, such as a logging area, when working in a manually-controlled way. Likewise, the operator is at all times aware of the limits of the working area of the work machine within its physical range, as well as the limits of the working area of the work machine within the scope of its stability, because the present solution makes it possible to take note of the inclination of the terrain as well as the tilting moment of the work machine working in the working area with the associated safety limits.

By the one or more light patterns 3 projected by the light source 2 on a working area of a work machine operator, the need to shift the operator's gaze is reduced and consequently the cognitive strain of the operator is lightened by providing information supporting decision-making visually straight into the working view.

Figure 3:
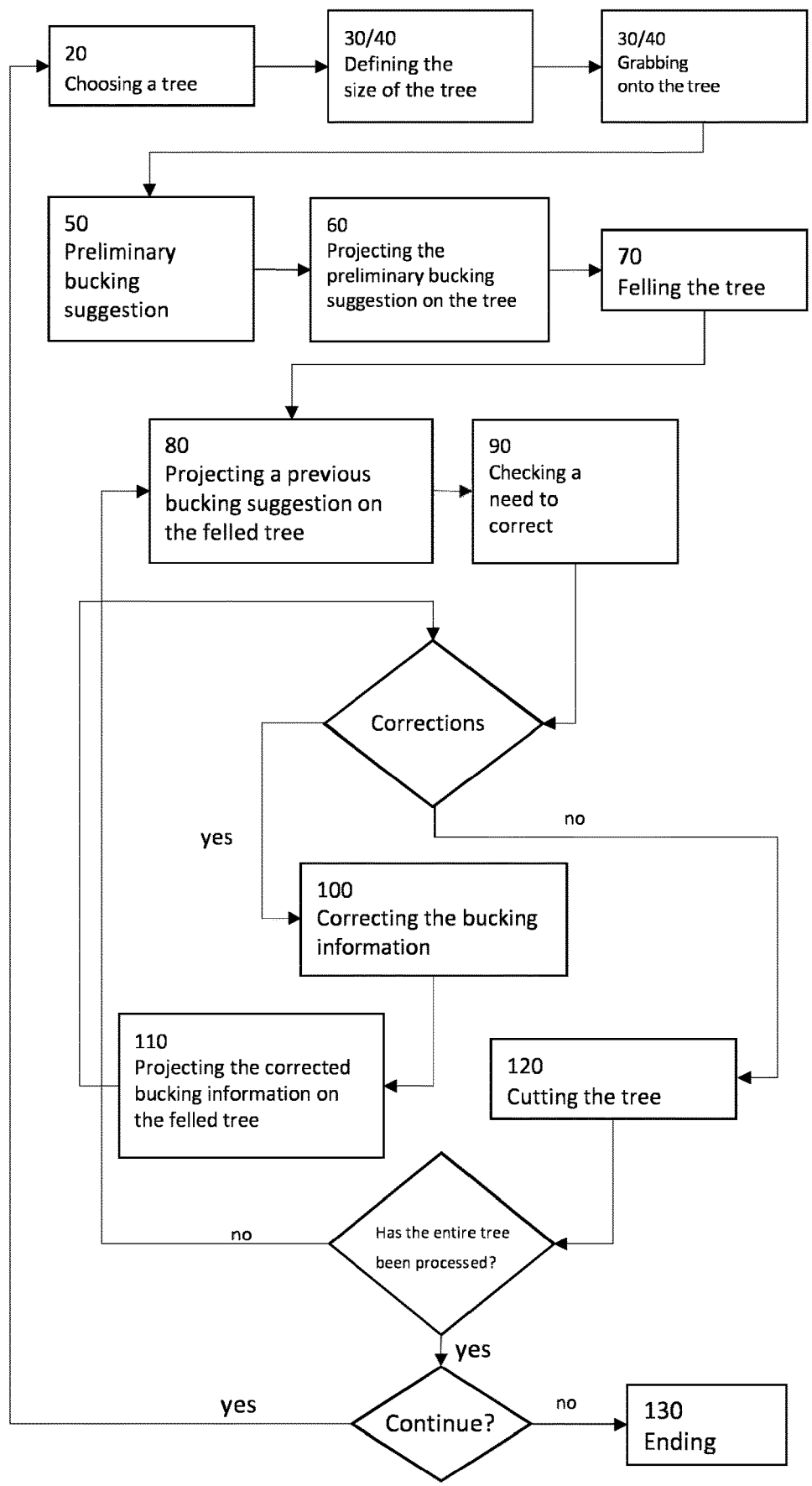
FIG. 3 shows in a schematic manner an arrangement for bucking a tree to be felled.

In a particularly preferred embodiment, bucking information 10 of a tree trunk 9 being handled is drawn by one or more light sources 2 on the tree trunk. FIG. 3 is a schematic view of the work phases related to the bucking of a tree to be cut. In such a case, work progresses so that:

At work phase 20, a tree indicated by light patterns 3 of the light source 2 is chosen to be processed next;

At work phases 30 and 40, the diameter and total length of the tree is estimated by contactless measurement: alternatively, the tree is grabbed onto, whereby the tree diameter may be mechanically measured and the length of the tree hereby estimated;

At work phase 50, the control unit of the work machine produces a preliminary bucking suggestion;

At work phase 60, said preliminary bucking suggestion 10 is projected on the tree trunk by the light source 2, whereby the operator sees the first bucking suggestion already on a standing tree;

At work phase 70, the tree is felled;

At work phase 80, the bucking suggestion 10 is projected in real time on the tree trunk after the felling cut;

At work phase 90, the operator checks visually whether the cutting plan suggested by the control unit is acceptable or whether the tree trunk has faults or similar to be taken into account when cutting it;

At work phase 100, the operator performs the bucking correction needed in the subsequent cutting, to take into account the faults;

At work phase 110, the corrected bucking information of the tree is drawn on the tree trunk;

At work phase 120, the operator ensures the correctness of the bucking information and cuts the tree;

Work phases 80 to 120 are continued until the tree has been processed in the desired extent, after which work may be stopped—130—or restarted from work phase 20.

The present light pattern 3 projected on the surroundings of the work machine 1 may be accomplished by an arrangement installed in the work machine at the factory ready to be used. It is, however, equally possible to carry out the arrangement as a retrofit one, whereby the required number of light sources 2 is installed on different sides of the work machine, with the light sources being connected by wires or wirelessly to the control unit of the work machine. By the control unit, the arrangement is also adaptable to be in communication with the positioning system of the work machine. Thus, the light source directed to one or more parts of the surroundings forming the working area is adapted to produce at least one specifically defined specified-form light pattern on this working area.

A preferred embodiment of the light source 2 comprises one or more laser devices by means of which an adequate contrast may be achieved in most diverse lighting conditions when lights patterns are projected on the terrain.

By utilising the aforementioned arrangement and method, a work machine 1 is accomplished, which comprises a light source 2 adapted to it, such a light source being arranged to be directable to one or more parts of the surroundings around it, forming the working area, whereby the light source is adapted to produce at least one specifically defined specified-form light pattern which may be projected on said working area.

Those skilled in the art will find it obvious that, as technology advances, the basic idea of the invention may be implemented in many different ways. The invention and its embodiments are thus not restricted to the above-described examples but may vary within the scope of the claims.

The invention claimed is:

1. A method for assisting the control of a forest work machine, to which forest work machine a light source is adapted, which is directable to one or more different parts of the surroundings around it, forming the working area, which
light source is adapted to produce at least one specifically defined specified-form light pattern on said working area such that
this light pattern provides visual information content on the working area to support an operator using the work machine, whereby
information content is separately defined to be control measures that may be performed on each working area, or theft restrictions, and
conveying information to the operator of the forest work machine by one or more light patterns simultaneously projected on the working area,
characterized by projecting, on a tree trunk to be processed by the forest work machine at any particular time, bucking information produced by a control unit in the work machine.

2. A method as claimed in claim 1, characterized by forming the light pattern from a combination of at least one piece of alphanumeric information and a geometric shape projected on the working area.

3. A method as claimed in claim 1, characterized by projecting the light patterns on at least two wavelengths.

4. A method as claimed in claim 1, characterized by controlling the light source by information continuously available on the control of the forest work machine.

5. A method as claimed in claim 4, characterized by controlling the light source by information continuously available on the positioning information of the forest work machine.

6. An arrangement in a light source directable to different one or more parts of the surroundings around a forest work machine, forming the working area, which
the light source is adapted to produce at least one specifically defined specified-form light pattern on said working area,
the one or more light patterns simultaneously projected on the working area comprise information to be conveyed to the operator of the forest work machine,
wherein the light pattern comprises, projected on a tree trunk to be processed by the forest work machine at any particular time, bucking information produced by a control unit on the work machine.

7. An arrangement as claimed in claim 6, wherein the light pattern comprises a combination of at least one piece of alphanumeric information and geometric shape projected on the working area.

8. An arrangement as claimed in claim 6, wherein the light patterns are projected on at least two wavelengths.

9. An arrangement as claimed in claim 6, wherein the light source is adapted to be in communication with the control unit of the forest work machine to control the light source.

10. An arrangement as claimed in claim 6, wherein the light source comprises one or more laser devices.

11. A forest work machine, comprising a light source adapted to it, such a light source being arranged to be directable to one or more different parts of the surroundings around it, forming the working area, which
the light source is adapted to produce at least one specifically defined specified-form light pattern which may be projected on said working area, whereby
the one or more light patterns simultaneously projected on the working area comprise information to be conveyed to the operator of the forest work machine,
wherein the light pattern comprises, projected on a tree trunk to be processed by the forest work machine at any particular time, bucking information produced by a control unit on the work machine.

* * * * *